United States Patent
Heinzelmann

(10) Patent No.: US 7,350,430 B2
(45) Date of Patent: Apr. 1, 2008

(54) TRANSMISSION HAVING DIRECT GEAR

(75) Inventor: Karl-Fritz Heinzelmann, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 102 days.

(21) Appl. No.: 10/525,853

(22) PCT Filed: Aug. 23, 2003

(86) PCT No.: PCT/EP03/09373

§ 371 (c)(1),
(2), (4) Date: Feb. 25, 2005

(87) PCT Pub. No.: WO2004/025140

PCT Pub. Date: Mar. 25, 2004

(65) Prior Publication Data

US 2006/0166787 A1    Jul. 27, 2006

(30) Foreign Application Priority Data

Aug. 28, 2002 (DE) ................................ 102 39 396

(51) Int. Cl.
*F16H 3/08* (2006.01)
*F16H 3/44* (2006.01)
(52) U.S. Cl. ........................................ 74/325; 475/302
(58) Field of Classification Search ................. 74/325, 74/329, 331; 475/207, 302, 303
See application file for complete search history.

(56) References Cited

U.S. PATENT DOCUMENTS 3,293,931 A * 12/1966 Beattie ........................ 74/325
3,429,202 A * 2/1969 Galicher ..................... 475/209
5,105,674 A    4/1992 Rea et al.
5,390,559 A * 2/1995 Thomas et al. ............... 74/325
5,679,096 A * 10/1997 Stine et al. .................. 477/111
5,881,600 A    3/1999 Fan
6,440,032 B1   8/2002 Stauber et al.
6,612,959 B2 * 9/2003 Frost .......................... 475/288

FOREIGN PATENT DOCUMENTS

| DE | 606 269 | 8/1932 |
| DE | 2 148 090 | 4/1973 |
| DE | 41 17 642 A1 | 3/1992 |
| DE | 42 26 575 A1 | 9/1993 |
| DE | 198 31 293 A1 | 1/2000 |
| DE | 100 51 354 A1 | 5/2002 |
| DE | 100 63 847 A1 | 6/2002 |
| GB | 2113322 A * | 8/1983 |
| GB | 2 175 361 A | 11/1986 |
| WO | WO9310378 * | 5/1993 |

* cited by examiner

*Primary Examiner*—Roger Pang
(74) *Attorney, Agent, or Firm*—Davis Bujold & Daniels, P.L.L.C.

(57) ABSTRACT

A transmission for a motor vehicle comprising an input shaft (1), an output shaft (2) and at least one countershaft (3). The transmission comprises at least one direct gear and the parts of the transmission that are not involved in the power flow in the direct gear, are completely or partially uncoupled when the direct gear is engaged.

8 Claims, 2 Drawing Sheets

TRANSMISSION HAVING DIRECT GEAR

This application is a national stage completion of PCT/EP2003/009373 filed Aug. 23, 2003 which claims priority from German application Ser. No. 102 39 396.6 filed Aug. 28, 2002.

FIELD OF THE INVENTION

The present invention relates to a transmission for a motor vehicle comprising an input shaft, an output shaft, and at least one countershaft, wherein the transmission comprises at least one direct gear.

BACKGROUND OF THE INVENTION

According to the state of the art, for the purpose of minimizing fuel consumption, powertrains for motor vehicles are frequently designed such that the main drive parts are driven in the direct gear. In the direct gear, the power flow occurs by way of direct coupling of the input shaft with the output shaft, which results in an increase in the degree of efficiency. By contrast, in the additional non-direct gears further losses develop, for example, due to gear meshing under load, dynamic anti-friction bearing load and pump power.

In transmissions in the direct gear, according to the state of the art, the power-conducting parts required for the remaining gears are not entirely uncoupled as is the case, for example, in the transmission of DE 198 31 293 A1 of the Applicant. Due to the fact that the countershafts are driven via a drive constant, the shafts, wheels, bearings, synchronizing parts, etc., each rotate along at the speed specified by the drive constant, although these parts are not involved in the power transmission process.

Due to the resulting friction, which also develops in the unloaded state, the degree of efficiency of the transmission deteriorates. The friction can be caused through churning losses caused by the immersion of the gear wheels in the oil pan or by friction losses on the synchronizations and on the bearings.

DE 41 17 642 A1 describes a multi-shaft transmission with several gear in which at least one gear is formed by a gear set, wherein the gear wheels of the gear set are rotatably seated on corresponding shafts and mesh on a continuous basis, and wherein each shaft comprises a clutch or synchronizing device in order to complete or interrupt the torque transmission path via the clutch. This way the gear wheels of the gear set can be isolated from the input and output so that the total inertia mass of the rotating gear parts is reduced. This design has the disadvantage that by using two synchronizing devices for one gear set the manufacturing and maintenance costs are negatively impacted.

It is the objective of the present invention to provide a transmission comprising an input shaft, an output shaft and at least one countershaft, which avoids the disadvantages of the state of the art and exhibits an optimized degree of efficiency in the direct gear.

SUMMARY OF THE INVENTION

A transmission for a motor vehicle is suggested, comprising an input shaft, an output shaft and at least one countershaft, wherein the transmission comprises at least one direct gear and wherein the parts that are not involved in the power flow in the direct gear are completely or partially uncoupled when the direct gear is engaged.

A particularly beneficial embodiment of the present invention provides that only the input and output shafts and their internal connecting elements rotate in the direct gear.

Within the framework of another embodiment of the present invention, it is suggested in the case of transmissions with a drive constant to design the gearing arranged on the input shaft such that it can be engaged or disengaged using a shift element so that, e.g., the countershaft does not rotate too.

In transmissions comprising two drive constants, according to the invention, the shift collar between the drive constants is shifted to "neutral".

Another variation of the design, according to the invention, provides that the input and output shafts can be connected directly via a connecting element without using a gear wheel as the connecting element.

The principle presented here can be used in transmissions with a downstream group for the main transmission, both in directly and in indirectly shifted downstream groups. Additionally, it is possible in transmissions with a downstream group to apply the inventive design also for the downstream group. Here the input is connected directly to the output of the downstream group; the remaining parts that are not involved in the power flow are uncoupled according to the invention. Furthermore, the invention can be applied for both single and multiple countershaft transmissions.

BRIEF DESCRIPTION OF THE DRAWINGS

The invention will now be described, by way of example, with reference to the accompanying drawings in which.

DETAILED DESCRIPTION OF THE INVENTION

Figure 1:
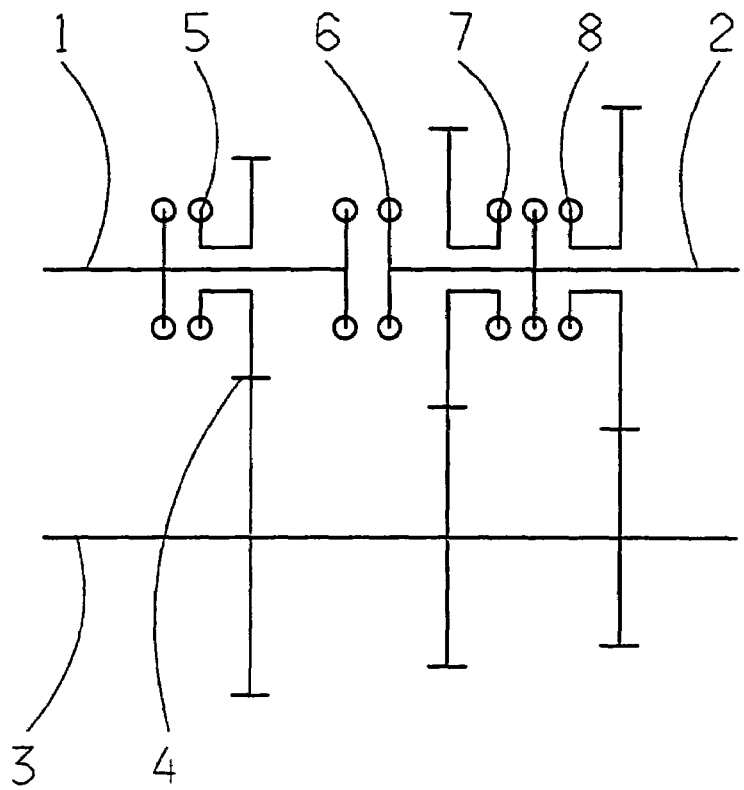
FIG. 1 is a first embodiment of a transmission pursuant to the invention, comprising a countershaft and an input constant.

FIG. 1 illustrates a transmission comprising an input shaft 1, an output shaft 2 and a countershaft 3, which comprises a drive constant 4. According to the invention, the gearing of the drive constant 4, arranged on the input shaft 1, is designed such that it can be engaged or disengaged using a shift element 5 so that the countershaft 3 does not rotate in the direct gear. For the purpose of shifting the direct gear, another connecting or shift element 6 is provided, which connects the input shaft 1 to the output shaft 2. Due to this direct connection without the necessity of using a gear wheel, friction losses are further minimized.

FIG. 1 shows additional shift elements 7, 8, which are used for shifting the indirect gears. Within the framework of the embodiment shown in FIG. 1, only the input shaft 1 and the output shaft 2 rotate in the direct gear so that friction losses are largely avoided.

Figure 2:
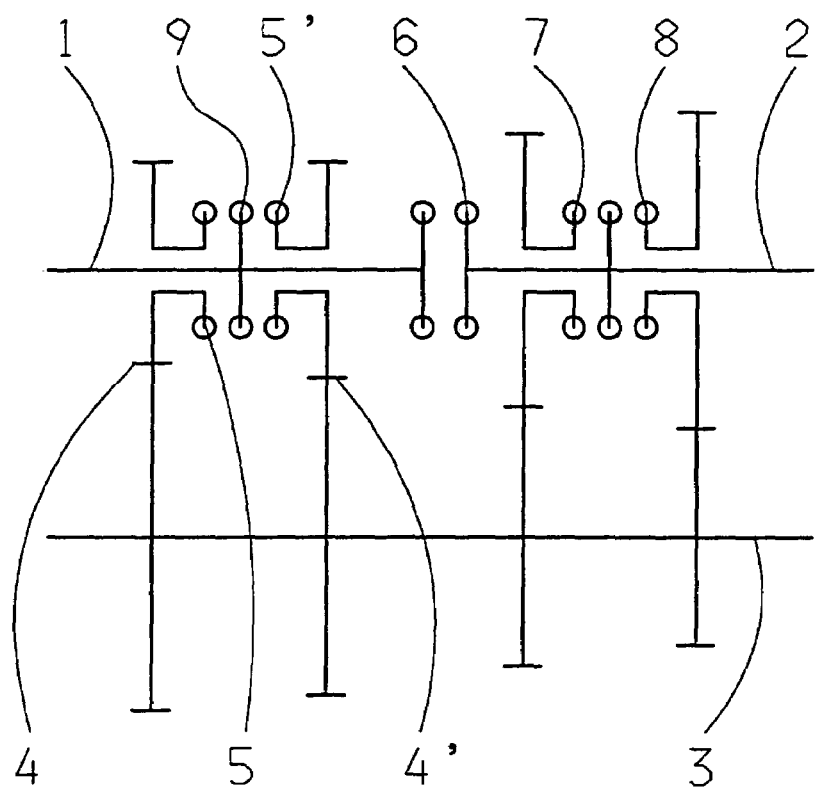
FIG. 2 is a second embodiment of a transmission pursuant to the invention, comprising a countershaft and two input constants.

FIG. 2 illustrates a transmission comprising the countershaft 3 and two drive constants 4, 4'. In such gears, in the direct gear the shift collar 9 between the drive constants 4, 4' is shifted to "neutral"; the gearing of the drive constants 4, 4' is, likewise, designed such that it can be engaged or disengaged using the shift elements 5, 5'.

Figure 3:
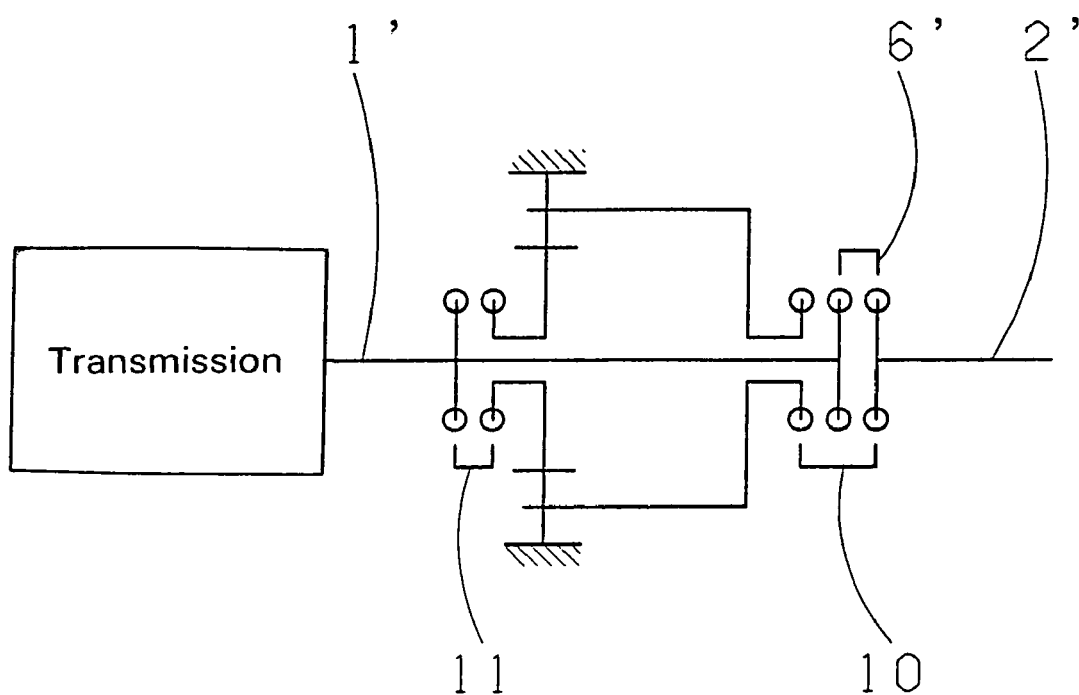
FIG. 3 is a third embodiment of a transmission pursuant to the invention, comprising a downstream arranged range group with a direct connection of the input and output.

FIG. 3 shows anarea a rance group arranged downstream from the transmission. According to the invention, an input 1' is directly connected to a output 2' of the downstream arranged range group via a shift element 6'; the remaining parts not involved in the power flow are uncoupled according to the invention. For an indirect gear, the shift element 6' is engaged and additional shift elements 10, 11 are disengaged.

REFERENCE NUMERALS

| Reference numerals | |
|---|---|
| 1 | input shaft |
| 1' | input shaft of the downstream arranged range group |
| 2 | output shaft |
| 2' | output shaft with the downstream arranged range group |
| 3 | countershaft |
| 4 | drive constant |
| 4' | drive constant |
| 5 | shift element |
| 5' | shift element |
| 6 | shift element |
| 6' | shift element |
| 7 | shift element |
| 8 | shift element |
| 9 | shift collar |
| 10 | shift element |
| 11 | shift element |

The invention claimed is:

1. A transmission for a motor vehicle, having a transmission input shaft (1), a transmission output shaft (2), and at least one countershaft (3), the transmission input shaft (1) the transmission output shaft (2), and the at least one countershaft (3) each supporting at least one gear, the transmission having a transmission direct gear for directly coupling the transmission input shaft (1) with the transmission output shaft (2);
 a range group being arranged downstream of the transmission, the range group having a range group input shaft (1') and a range group output shaft (2') and a range group direct gear for directly connecting the range group input shaft (1') to the range group output shaft (2');
 the transmission having a transmission direct gear shift element which, upon engagement of the transmission direct gear shift element, attains the transmission direct gear; and
 the range group having a range group direct gear shift element which, upon engagement of the range group direct gear shift element, attains range group direct gear;
 wherein when the transmission direct gear couples the transmission input shaft (1) to the transmission output shaft (2) and when the range group direct gear directly connects the range group input shaft (1') to the range group output shaft (2'), only the transmission input shaft (1), the transmission output shaft (2), the range group input shaft (1') and the range group output shaft (2'), along with the transmission direct gear, the range group direct gear, the transmission direct gear shift element and the range group direct gear shift element, rotate so as to minimize friction losses within the transmission and the range group.

2. The transmission according to claim 1, wherein the range group comprises a planetary gear set.

3. The transmission according to claim 2, wherein the range group has first, second and third range group shift elements (6', 10, 11) and upon engagement of the first range group shift element (6'), the range group input shaft (1') is directly coupled to the range group output shaft (2'), and upon engagement of the second and the third range group shift elements (10, 11), the range group input shaft (1') is indirectly coupled to the range group output shaft (2') via the planetary gear set.

4. The transmission according to claim 1, wherein the range group direct gear includes a range group connecting element (6') for directly connecting the range group input shaft (1') to the range group output shaft (2').

5. The transmission according to claim 1, wherein the transmission comprising a drive constant gearing (4), supported by the transmission input shaft (1), which is engageable via a first transmission shift element (5).

6. The transmission according to claim 1, wherein in transmission comprising first and second drive constant gears (4, 4') with a shift collar (9) located between the first and second drive constant gears (4, 4'), and gearings of the first and the second drive constant gears (4, 4') are supported by the transmission input shaft (1) such that the gearings of the first and the second drive constant gears (4, 4') can be engaged or disengaged via transmission shift elements (5, 5').

7. A transmission for a motor vehicle, having a transmission input shaft (1), a transmission output shaft (2), and at least one countershaft (3), the transmission input shaft (1) and the transmission output shaft (2) each supporting at least one freely rotatable gear, the transmission having a transmission direct gear for directly coupling the transmission input shaft (1) with the transmission output shaft (2);
 a range group being arranged downstream of the transmission, the range group having a range group input shaft (1') and a range group output shaft (2') and a range group direct gear for directly connecting the area range group input shaft (1') to the range group output shaft (2');
 a transmission direct gear shift element for the transmission in which the transmission shift element is actuated in order to attain direct gear in the transmission; and
 a range group direct gear shift element for the range group in which the range group shift element is actuated in order to attain direct gear in the range group;
 wherein when the transmission direct gear couples the transmission input shaft (1) to the transmission output shaft (2) and when the range group direct gear directly connects the range group input shaft (1') to the range group output shaft (2'), the at least one freely rotatable gear on the transmission input shaft (1) is uncoupled therefrom and the at least one freely rotatable gear on the transmission output shaft (2) is uncoupled therefrom and only the transmission input shaft (1), the transmission output shaft (2), the range group input shaft (1') and the range group output shaft (2'), along with the transmission direct gear, the range group direct gear and the direct gear shift element of both the transmission and the range group, rotate so as to minimize friction losses within the transmission and the range group.

8. A transmission for a motor vehicle comprising:
 a transmission input shaft (1) and a transmission output shaft (2) each supporting at least one freely rotatable gear;
 at least one countershaft (3);

a transmission direct gear for coupling the transmission input shaft (1) with the transmission output shaft (2) to define a direct gear state; and a range group arranged downstream of the transmission, the range group comprising;

a range group input shaft (1') and a range group output shaft (2'); and, a range group direct gear for connecting the range group input shaft (1') to the range group output shaft (2');

wherein, when the transmission direct gear is engaged during the direct gear state, rotating elements of the transmission consist solely of a power flow path which includes only the transmission input shaft (1), the transmission output shaft (2), the range group input shaft (1'), the range group output shaft (2') so to minimize friction losses within the transmission and the range group.

* * * * *